United States Patent [19]

Wencley et al.

[11] 4,244,901

[45] Jan. 13, 1981

[54] METHOD OF BONDING STRUCTURAL SUPPORT MEMBERS TO FLAT SHEETS

[75] Inventors: Stanley E. Wencley, Rochester; Duane L. Headley, Oxford, both of Mich.

[73] Assignee: Foamseal, Inc., Oxford, Mich.

[21] Appl. No.: 938,599

[22] Filed: Aug. 31, 1978

[51] Int. Cl.³ .............................................. B29D 27/04
[52] U.S. Cl. ................................... 264/46.4; 52/309.5; 52/309.11; 52/602; 156/71; 156/79; 264/46.5; 264/251; 264/263; 428/55; 428/310
[58] Field of Search .................... 264/46.4, 46.5, 263, 264/251, 263; 52/309.5, 309.11, 602, 407; 428/55, 310; 156/71, 79

[56] References Cited

U.S. PATENT DOCUMENTS

| | | | |
|---|---|---|---|
| 3,258,889 | 7/1966 | Butcher | 52/309.11 |
| 3,300,931 | 1/1967 | Lutze | 52/309.11 X |
| 3,315,424 | 4/1967 | Smith | 264/46.5 X |
| 3,722,171 | 3/1973 | Godley | 52/309.5 X |
| 3,885,008 | 5/1975 | Martin | 264/46.4 X |
| 4,083,916 | 4/1978 | Chasse | 264/263 X |
| 4,125,979 | 11/1978 | McLaughlin | 52/602 X |

OTHER PUBLICATIONS

Bender, Rene J. "Handbook of Foamed Plastics," Libertyville, Ill., Lake Publishing Corp., ©1965, pp. 132, 163, 164.

Primary Examiner—Philip Anderson

[57] ABSTRACT

A prefabricated structural element and a method of bonding wallboard to structural elements such as trusses for use in construction or prefabrication of ceilings or walls. The method involves applying a resilient polyurethane foamable liquid by a high pressure impingement mixing spray gun onto areas of a clean, dry wallboard substrate which have wood trusses or studs placed upon them. The foam is sprayed on the drywall at the juncture with the wood members on both sides of the wooden members. The resulting bonded structure permits the unit to be used without further nailing or other attachment means. The foam also permits the combined product to present a flat surface regardless of irregularities in the wood trusses.

6 Claims, 1 Drawing Figure

U.S. Patent
Jan. 13, 1981
4,244,901
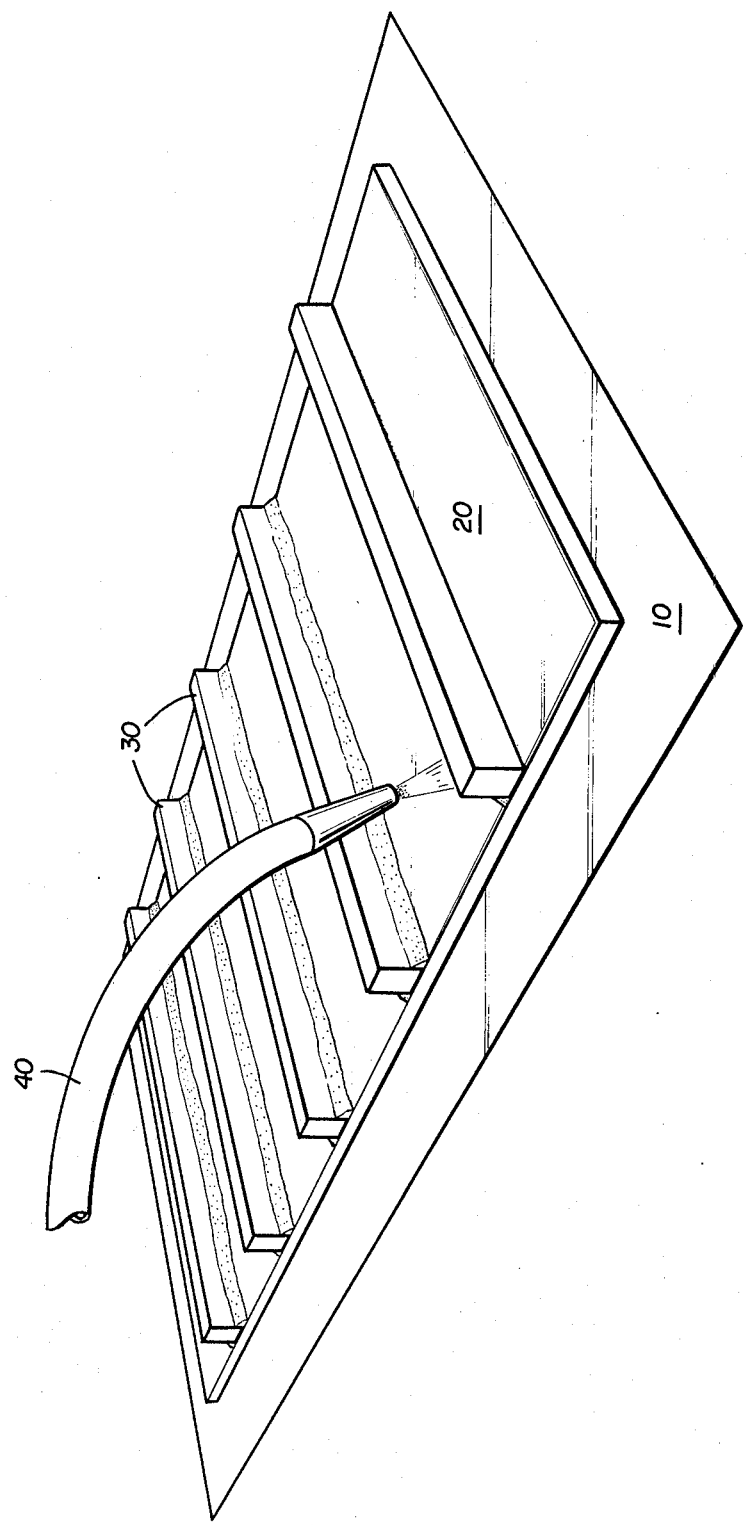

METHOD OF BONDING STRUCTURAL SUPPORT MEMBERS TO FLAT SHEETS

BACKGROUND OF THE INVENTION

In drywall construction and particularly in the mobile home industry where the trusses and wood studs are attached directly to sealing members or side of the home, the principal method of attachment involves mechanical fasteners, particularly the "Rosette" attachments, which are essentially aesthetically pleasing mechanical fasteners. Other means include staples or batten strips, particularly in side walls.

The conventional mechanical fasteners, including nailing, stapling and so forth, have structural problems in that the entire structure depends upon the alignment of trusses or studs. That is, if one of the trusses is warped or otherwise out of alignment, the surface which is mechanically attached or nailed to it gives or warps to fit that particular truss. This is likewise true if glue is used to secure the wood trusses to the dryboard. If the wood member is warped and does not fit flatly against the dryboard, then either a portion of the wood will not be bonded to the dryboard, leaving a gap between the wood and the board, or the wood surface is forced flat upon the dryboard by pressure and the resultant bonded structure is subject to a force exerted by the tendency of the wood to return to its warped position causing cracking or uneven surfaces on the face of the dryboard.

Additionally, the use of wallboard nails creates an expense of providing for coverage of the nail heads for aesthetic purposes. Normally, the nail head is driven into the board and covered with a paste which is in turn covered with a batten strip or a tape on the painted or finished surface. This is a time consuming process which often results in an aesthetic failure if proper care is not taken.

These problems become more pronounced in industries such as mobile home construction where the drywall is itself the finished surface and therefore must be free of all visible construction markings. Ceilings of mobile homes which are directly attached to the trusses are particularly susceptible to appearance problems. Previous attempted solutions involved "Rosette" attachments which are essentially a "decorative" type of screw or nail. Although adequate, their use was considered by some to be unattractive.

The method of the present invention allows for the permanent bonding of drywall or wallboard to its supporting members without mechanical fasteners and provides a flat continuous surface which does not warp or have signs of construction on its outer face.

SUMMARY OF THE INVENTION

The instant invention provides a method of bonding wallboard or drywall to its structural support members by placing the wallboard or drywall on a flat surface and attaching wooden trusses or studs so as to hold them in place. Next, a high pressure impingement mixing spray gun is used to apply Foamseal Gypsum Bond-1000, which is a resilient two-part polyurethane foam system. The adhesive is applied to both sides of the structural members placed on the seams between two drywall sheets and on one side of those drywall sheets which have a structural member in the middle. The foam liquid expands to form a solid material that fills any void or irregularity under a support member. Therefore, the entire sealing or wall will be as flat and level as the fixture upon which the drywall was positioned. Since no other mechanical fasteners are necessary, there is no need for the old "Rosette" attachments nor for batten strips or staples. The entire assembly can be lifted into place by a crane-hoist.

The use of the adhesive system can be extended to all drywall construction and particularly where pre-assembly of a unit such as a ceiling or wall takes place in the factory or otherwise away from the side of the actual home. Techniques described herein provide a method of constructing a drywall surface which is flat, not subject to uneven stress in transportation, and provides an aesthetic surface without having to provide any ornaments or make any other provisions for concealing the markings of construction.

The method of the present invention provides a bonding seal which is impervious to time, temperature, humidity and mechanical drawing or shock which could loosen some of the more common mechanical attachment devices.

Furthermore, the urethane foam applied at the juncture of two or more drywalls acts as insulation which prevents air flow through drywall junctions which typically is a difficult place to keep airtight. Likewise, the application of the Gypsum Bond-1000 at the top and bottom and alongside the wooden rafters provide an extra amount of insulation at the edges of the ordinary insulative rolls which are placed between the rafters or studs. The present method, therefore, presents an extra amount of insulation at critical, hard-to-reach points, while providing the sealing strength necessary to form an integral unit of drywall in wood rafter or stud.

However, the most important aspect of the instant invention is the bonding together of a drywall member and structural support without mechanical fasteners, unsightly nails or other appearance detracting devices. All that is required is to place the drywall member on a flat surface and lay the support rafters, studs or trusses on the drywall sheets and spray the junctions. After it has been hardened, the integral structure is flat and any gaps between the wood and drywall produced by warpage in the wood support elements are filled by foam expansion. The result is a perfectly flat presenting surface of drywall with no appearance detracting fasteners to cover up or look at.

When used in a large operation such as prefabricated homes or walls, the present method lends itself to high volume operation without sacrificing quality, as the inspection techniques can be structural without concern for aesthetic inspection for poor workmanship in attaching holding devices such as batten strips or "Rosettes".

BRIEF DESCRIPTION OF THE DRAWINGS

These and other advantages of the present invention will become more readily apparent after reading the following written description of a prime embodiment of the present invention in conjunction with the appended claims and the attached drawing.

FIG. 1 shows a schematic drawing of the apparatus and steps of the present invention.

DETAILED DESCRIPTION

FIG. 1 illustrates the method of applying the urethane foam to a junction of drywall and rafter as would be used, for example, in a mobile home ceiling. The first step involves placing a clean flat surface 10 horizontal and laying the wallboard sections 20 on that surface 10. Then the wood rafters 30 are temporarily secured in their normal desired location. This temporary placement may be by staples or the flat surface 10 may have a fastening means to hold the rafters next to the wallboard on a temporary basis until the Gypsum Bond-1000 bonds permanently.

The Gypsum Bond-1000 used in the process is normally packaged in 55-gallon steel drums which are not harmed by exposure to temperatures between 0° F. and 100° F. but should be maintained at room temperature for several days before usage, above 65° F. If stored or used above 85° F., the drum is sealed to prevent evaporation of the blowing agent.

The Gypsum Bond-1000 is a closed cell resilient foamable polyurethane thermosetting resin designed to be applied through a high pressure impingement mixing spray gun and having the following weight composition:

|  | A-ISO |
|---|---|
| 100% | methylene bis(4-phenylisocyanate) |
|  | B-Resin |
| 62% | Phanol 650-X, Jefferson Chemical Co. |
|  | aromatic polyoxy |
|  | propylene glycol |
| 28% | Fluorocarbon, e.g. trichlorofluoromethane |
| 9% | Fyrol-6, Stauffer Chemical Corp. |
|  | flame retardant |
|  | diethyl, N, N bis (2-hydroxyethyl) |
|  | amino in ethyl phosphonate |
| 1% | Union Carbide 5420 |
|  | surfactant |
| Trace | UL-2, Witco Chemical Co. |
|  | tin-amine catalyst |

The pump should accurately meter the material one-to-one by volume and develop at least 400 psi hydraulic pressure while spraying and 800–1000 psi when installed. The material temperature leaving the spray gun should be between 95° F. and 105° F. A Gusmer Model D spray gun with size 40 to 46 mixing chamber has been used successfully. The material in the drums must be no less than 65° F. and it is recommended to be 75° F. to prevent cavitation of the pumps. The substrate to which the foam is to be applied should be clean and dry with loose dust blown off and free from liquid water, oil or grease. The substrate temperature should be 60° F. or higher.

The mixing spray gun 40 should be adjusted so that the applicator can accurately direct a stream to the interface of the wood member and the wallboard at approximately a 45° angle. This should generate a foam bead about 1¼ inch to 1½ inch in diameter at the intersection. The stream should be directed so that some of the liquid is directed under the wood member to increase the area of contact. The foam color should be a creamy light tan without dark or light streaks. Streaking is usually created by low temperature material, low pressures or improper gun adjustment.

The bond strength can be quickly checked by applying a one-inch bead between two two-inch by two-inch by three-inch boards and trimming such that the boards are separated by a one-inch thick block of foam that is three inches long and one and one-half inches wide. According to those specifications, it should take approximately 50 pounds of force to separate these boards after a 15–20 minute cure. The processing conditions and physical properties of the integral structure are indicated in the Table I below:

TABLE I

| Foamseal Gypsum Bond-1000 | |
|---|---|
| Processing Conditions | |
| Gusmer equipment used - nozzle size | 40 or 46 |
| Cream time (sec.) | 3 |
| Gel time (sec.) | 8 |
| Tack free time (sec.) | 12 |
| Rise time (sec.) | 12 |
| Component temperatures (°F.) | 100–105 |
| Bead thickness, inches | 1–2 |
| Resin viscosity @ 25° C., cps. | 350 |
| Substrate temperature (°F.) | 70 |
| Physical Properties | |
| Density, lbs. per cu. ft. (core) | 2.3 |
| Tensile strength, psi ultimate | |
| Parallel to rise | 32 |
| Heat distortion temperature (°F.) | 225 |
| Dimensional stability, % change after | |
| 28 days at 100% RH and 158° F. | −1% weight, 16% volume |

Tests performed on the integral structure of gypsum wallboard and the trusses when bonded by the Gypsum Bond-1000 have shown a 278 pound per linear foot ultimate sheer resistance when tested for use in mobile home roof assembly. Thus, the method of the present invention can be used to permanently bond together drywalls and their supporting members without fear of structural defects or lack of permanence.

The foregoing is a complete description of the preferred embodiment of the invention. Various changes and modifications may be made without departing from the spirit and scope of the present invention. The invention, therefore, should be limited only by the scope of the following claims.

What is claimed is:

1. A method of permanently bonding structural support members to a flat, self-supporting flexible fiber sheet to form a structural building element, comprising the steps of:
   (a) supporting said fiber sheet on a flat, horizontal support surface;
   (b) placing said structural support members on the exposed surface of said sheet in the arrangement desired in the structural building element;
   (c) directing a stream of foamable liquid polyurethane thermosetting resin at an angle under pressure at the juncture between the structural elements and the fiber sheet; and
   (d) allowing the liquid polyurethane resin to foam and expand into the voids between the structural elements and the sheet and form a continuous bead at the juncture, permanently bonding the structural elements to the sheet and forming a flat, rigid structural building element.

2. The method of claim 1, wherein said foamable polyurethane resin is applied in a stream by a high impingement gun held at a 45° angle to said juncture.

3. The method of claim 1, wherein said foamable polyurethane resin is applied from said spray gun at a temperature in the range of 95° F. to 105° F.

4. The method of claim 1, wherein said spray gun is held at a distance of ten feet or less from the junctions of the structural support members and the fiber sheets.

5. The method of claim 1, wherein said fiber sheet is a dry wall sheet.

6. The method of claim 1, wherein said structural support members are wood rafters.

* * * * *